US010431185B2

(12) United States Patent
Choi et al.

(10) Patent No.: US 10,431,185 B2
(45) Date of Patent: Oct. 1, 2019

(54) DISPLAY SYSTEM REPLACING SIDE MIRROR AND METHOD FOR CONTROLLING OUTPUT BRIGHTNESS THEREOF

(71) Applicant: HYUNDAI MOTOR COMPANY, Seoul (KR)

(72) Inventors: Jae Seob Choi, Suwon-si (KR); Kap Je Sung, Suwon-si (KR); Jun Hyung Kim, Suwon-si (KR); Joong Ryoul Lee, Incheon (KR); Jun Sik An, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 12 days.

(21) Appl. No.: 15/344,823

(22) Filed: Nov. 7, 2016

(65) Prior Publication Data
US 2018/0018939 A1    Jan. 18, 2018

(30) Foreign Application Priority Data
Jul. 12, 2016    (KR) .......................... 10-2016-0088166

(51) Int. Cl.
*G09G 5/10*    (2006.01)
*B60K 35/00*    (2006.01)
(Continued)

(52) U.S. Cl.
CPC .............. *G09G 5/10* (2013.01); *B60K 35/00* (2013.01); *B60R 1/00* (2013.01); *B60R 11/04* (2013.01);
(Continued)

(58) Field of Classification Search
CPC ............. G09G 5/10; B60K 35/00; B60R 1/00
See application file for complete search history.

(56) References Cited

U.S. PATENT DOCUMENTS 7,432,800 B2 * 10/2008 Harter, Jr. .............. B60Q 9/008
340/435
2002/0062189 A1 * 5/2002 Kannonji ............... G08G 1/161
701/96
(Continued)

FOREIGN PATENT DOCUMENTS

JP        05-319174 A       12/1993
JP        H05-318174 A      12/1993
(Continued)

OTHER PUBLICATIONS

Original Document with Machine Translation to English for JPH05319174.*
(Continued)

*Primary Examiner* — Jacinta M Crawford
*Assistant Examiner* — Terrell M Robinson
(74) *Attorney, Agent, or Firm* — Morgan, Lewis & Bockius LLP (57) ABSTRACT

A display system replacing a side mirror includes: a camera unit including cameras provided on both side surfaces of a vehicle and obtaining a rear-view image; a display unit outputting the rear-view image obtained by the camera unit; a driving condition detector detecting a driving condition of the vehicle; and a controller controlling output brightness of the display unit on the basis of the driving condition of the vehicle.

17 Claims, 9 Drawing Sheets

(51) Int. Cl.
*B60R 1/00* (2006.01)
*B60R 11/04* (2006.01)

(52) U.S. Cl.
CPC .... *B60K 2370/152* (2019.05); *B60K 2370/16* (2019.05); *B60K 2370/21* (2019.05); *B60K 2370/349* (2019.05); *B60R 2300/202* (2013.01); *B60R 2300/8026* (2013.01); *B60R 2300/8046* (2013.01); *G09G 2360/144* (2013.01); *G09G 2380/10* (2013.01)

(56) References Cited

U.S. PATENT DOCUMENTS

| | | | | |
|---|---|---|---|---|
| 2002/0075136 | A1* | 6/2002 | Nakaji | B60K 35/00 340/425.5 |
| 2008/0151048 | A1 | 6/2008 | Watanabe et al. | |
| 2010/0253597 | A1* | 10/2010 | Seder | B60R 1/00 345/7 |
| 2011/0115615 | A1* | 5/2011 | Luo | B60R 1/00 340/436 |
| 2012/0072097 | A1* | 3/2012 | Ohta | B60R 1/00 701/1 |
| 2012/0215377 | A1* | 8/2012 | Takemura | B60W 30/12 701/1 |
| 2013/0345900 | A1* | 12/2013 | Usui | B60W 30/12 701/1 |
| 2015/0042797 | A1 | 2/2015 | Alam et al. | |
| 2016/0347251 | A1* | 12/2016 | Shigemura | B60R 1/00 |
| 2017/0098130 | A1* | 4/2017 | Watanabe | G06K 9/00805 |
| 2017/0369067 | A1* | 12/2017 | Saigusa | B60W 30/18163 |
| 2018/0009374 | A1* | 1/2018 | Kim | B60Q 1/503 |

FOREIGN PATENT DOCUMENTS

| | | |
|---|---|---|
| JP | 2751847 B2 | 5/1998 |
| JP | 2005-014782 A | 1/2005 |
| JP | 2008-022125 A | 1/2008 |
| KR | 10-2006-0096885 A | 9/2006 |
| KR | 10-2008-0096885 A | 9/2006 |
| KR | 10-1111548 B1 | 2/2012 |
| KR | 10-2015-0142274 A | 12/2015 |
| KR | 10-1605660 B1 | 3/2016 |

OTHER PUBLICATIONS

Original Document with Machine Translation to English for JP 2005014782 A.*
Original Document with Machine Translation to English for KR101605660.*
Original Document with Machine Translation to English for KR20080096885.*
Korean Office Action issued in Application No. 10-2016-0088166 dated Jun. 21, 2017.

* cited by examiner

DISPLAY SYSTEM REPLACING SIDE MIRROR AND METHOD FOR CONTROLLING OUTPUT BRIGHTNESS THEREOF

CROSS-REFERENCE TO RELATED APPLICATION

This application is based on and claims the benefit of priority to Korean Patent Application No. 10-2016-0088166, filed on Jul. 12, 2016, in the Korean Intellectual Property Office, the disclosure of which is incorporated herein in its entirety by reference.

TECHNICAL FIELD

The present disclosure relates to a display system replacing a side mirror and a method for controlling output brightness thereof.

BACKGROUND

A side mirror is equipped on both sides of a vehicle for the purpose of helping a driver to recognize rear vehicles. The side mirror helps safe driving of a driver, but causes aerodynamic resistance while the vehicle is running, leading to problems such as reduced fuel efficiency and noise generation. In addition, the side mirror may be problematic in helping the driver to see rearward in a dark environment.

Recently, in order to solve the aforementioned problems of the side mirror, a side camera and a display system that replace the side mirror have been developed. The side camera may be smaller than the side mirror to reduce air resistance, and visibility may be secured by adjusting the sensitivity of the camera even in insufficient light environment.

A display unit of the display system replacing the side mirror may output an image with constant brightness, irrespective of surrounding environmental changes, and thus, the driver may recognize the rear view that is somewhat different from a real driving environment.

SUMMARY

The present disclosure has been made to solve the above-mentioned problems occurring in the prior art while advantages achieved by the prior art are maintained intact.

An aspect of the present disclosure provides a driver with a side camera image with an appropriate brightness level adequate for driving conditions to improve driving convenience.

The technical problems to be solved by the present inventive concept are not limited to the aforementioned problems, and any other technical problems not mentioned herein will be clearly understood from the following description by those skilled in the art to which the present disclosure pertains.

According to an embodiment in the present disclosure, a display system replacing a side mirror may include: a plurality of cameras provided on both side surfaces of a subject vehicle and obtaining a rear-view image; a display displaying the rear-view image obtained by the cameras; a driving condition detector detecting a driving condition of the subject vehicle; and a controller controlling output brightness of the display on the basis of the driving condition of the subject vehicle.

The controller may control the output brightness of the display to be brighter when a reference driving condition is detected than when the reference driving condition is not detected.

The controller may increase an accumulated value over a period of time for which a reference driving condition is detected, and may decrease the accumulated value over a period of time for which the reference driving condition is not detected. The controller may control the output brightness of the display to be brighter when the accumulated value exceeds a reference value than when the accumulated value is less than or equal to the reference value.

The controller may control the output brightness of the display when detection of a reference driving condition is maintained for a reference time or more.

The driving condition detector may include a speed detector measuring a speed of the subject vehicle, and the controller may control the output brightness of the display to be brighter when the speed of the subject vehicle is lower than or equal to a reference speed than when the speed of the subject vehicle exceeds the reference speed.

The driving condition detector may include a rear vehicle detector measuring a distance from the subject vehicle to a rear vehicle behind the subject vehicle, and the controller may control the output brightness of the display to be brighter when the distance from the subject vehicle to the rear vehicle is less than or equal to a reference distance than when the distance from the subject vehicle to the rear vehicle exceeds the reference distance.

The controller may determine a position of the rear vehicle in relation to the subject vehicle, may control output brightness of a rear-view image obtained by a camera positioned on a left side surface of the subject vehicle when the rear vehicle is positioned on a left side of the subject vehicle, and may control output brightness of a rear-view image obtained by a camera positioned on a right side surface of the subject vehicle when the rear vehicle is positioned on a right side of the subject vehicle.

The controller may calculate a relative speed of the rear vehicle with respect to the subject vehicle on the basis of the distance from the subject vehicle to the rear vehicle behind the subject vehicle, and may control the output brightness of the display to be brighter when the relative speed exceeds 0 than when the relative speed is less than or equal 0.

The controller may control output brightness of the rear-view image on the basis of a level of the relative speed.

The controller may calculate a relative acceleration of the rear vehicle with respect to the subject vehicle on the basis of the relative speed, and may control the output brightness of the display to be brighter when the relative acceleration exceeds 0 than when the relative acceleration is less than or equal to 0.

The controller may control output brightness of the rear-view image on the basis of a level of the relative acceleration.

The driving condition detector may include a turn signal lamp operation detector detecting whether or not a turn signal lamp of the subject vehicle is operated, and the controller may control the output brightness of the display to be brighter when the turn signal lamp is operated than when the turn signal lamp is not operated.

The controller may control output brightness of a rear-view image obtained by a camera o positioned on a left side surface of the subject vehicle when a left turn signal lamp is operated, and may control output brightness of a rear-view image obtained by a camera positioned on a right side surface of the subject vehicle when a right turn signal lamp is operated.

The driving condition detector may include a lane departure detector detecting whether or not the subject vehicle moves out of its lane, and the controller may control the output brightness of the display to be brighter when the subject vehicle moves out of the lane than when the subject vehicle does not move out of the lane.

The controller may determine a position of the lane form which the subject vehicle has departed in relation to the subject vehicle, may control output brightness of a rear-view image obtained by a camera positioned on a left side surface of the subject vehicle when the lane is positioned on a left side of the subject vehicle, and may control output brightness of a rear-view image obtained by a camera positioned on a right side surface of the subject vehicle when the lane is positioned on a right side of the subject vehicle.

The driving condition detector may include an illumination detector measuring a level of illumination which is brightness of light illuminating the subject vehicle, and the controller may control the output brightness of the display to be brighter when the level of illumination is higher than or equal to a reference level of illumination than when the level of illumination is lower than the reference level of illumination.

The display may be positioned in a cluster of the subject vehicle.

The display may include a plurality of display parts, and a display part, which is positioned on a left side of a steering wheel of the subject vehicle among the plurality of display parts, may output a rear-view image obtained by a camera positioned on a left side surface of the subject vehicle, and a display part, which is positioned on a right side of the steering wheel of the subject vehicle among the plurality of display parts, may output a rear-view image obtained by a camera positioned on a right side surface of the subject vehicle.

According to another embodiment in the present disclosure, a method for controlling output brightness of a display system replacing a side mirror may include: obtaining a rear-view image from a camera provided on both side surfaces of a subject vehicle; detecting, by a driving condition detector, a driving condition of the vehicle; determining, by a controller, output brightness of a display on the basis of the driving condition of the subject vehicle; and displaying, by a display, the rear-view image obtained by the camera unit with the determined output brightness.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
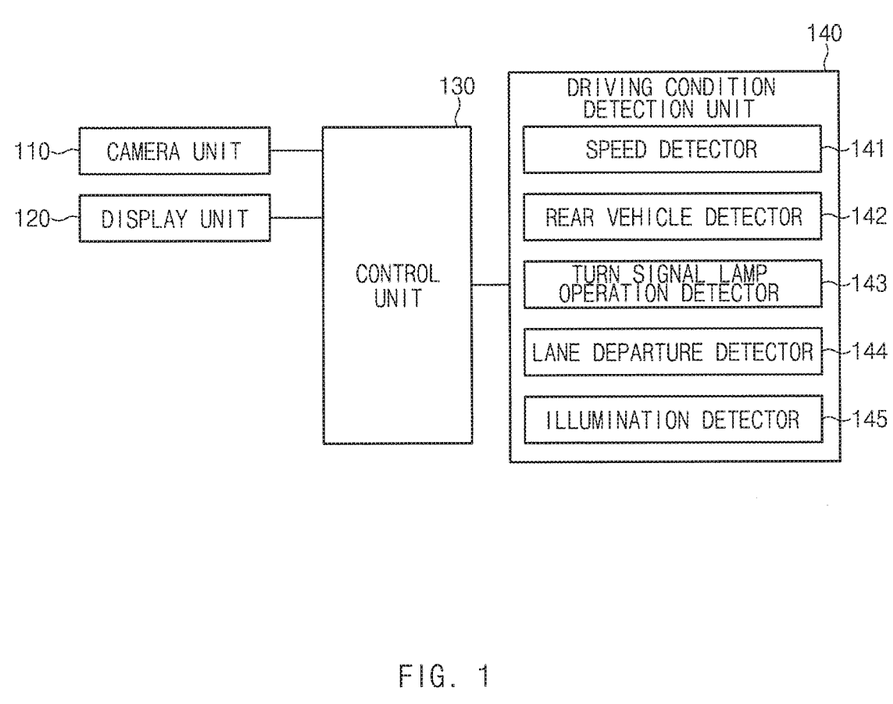
FIG. 1 illustrates a block diagram of a display system replacing a side mirror, according to an exemplary embodiment in the present disclosure.
Figure 2:
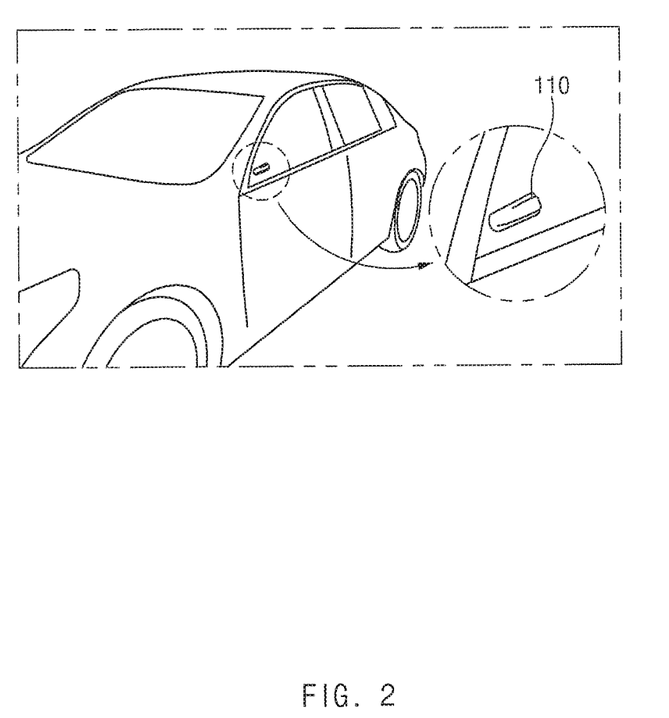
FIG. 2 illustrates a vehicle equipped with a camera, according to an exemplary embodiment in the present disclosure.
Figure 3A:
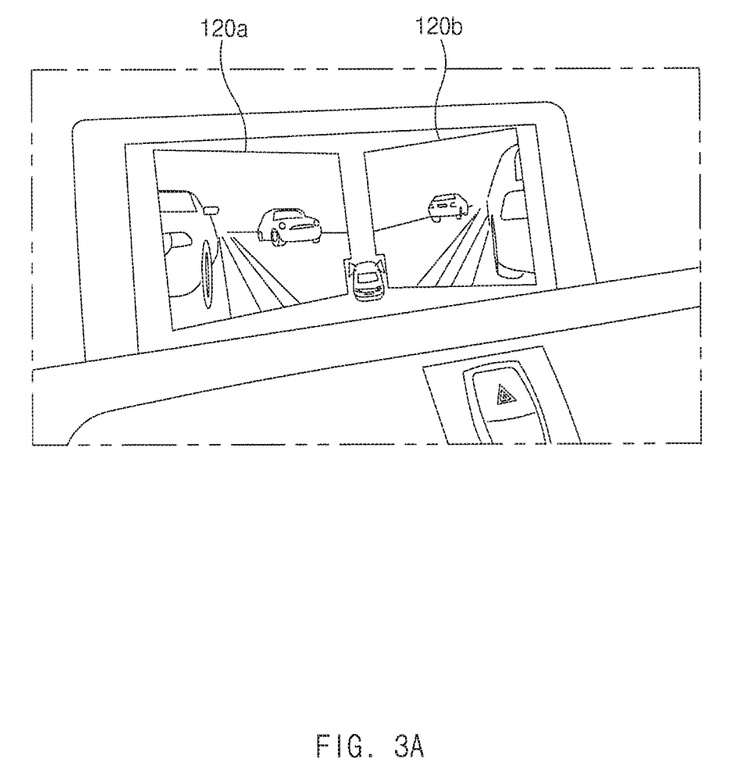
FIG. 3A illustrates a display unit that is positioned in a center fascia of a vehicle and outputs a rear-view image, according to an exemplary embodiment in the present disclosure.
Figure 3B:
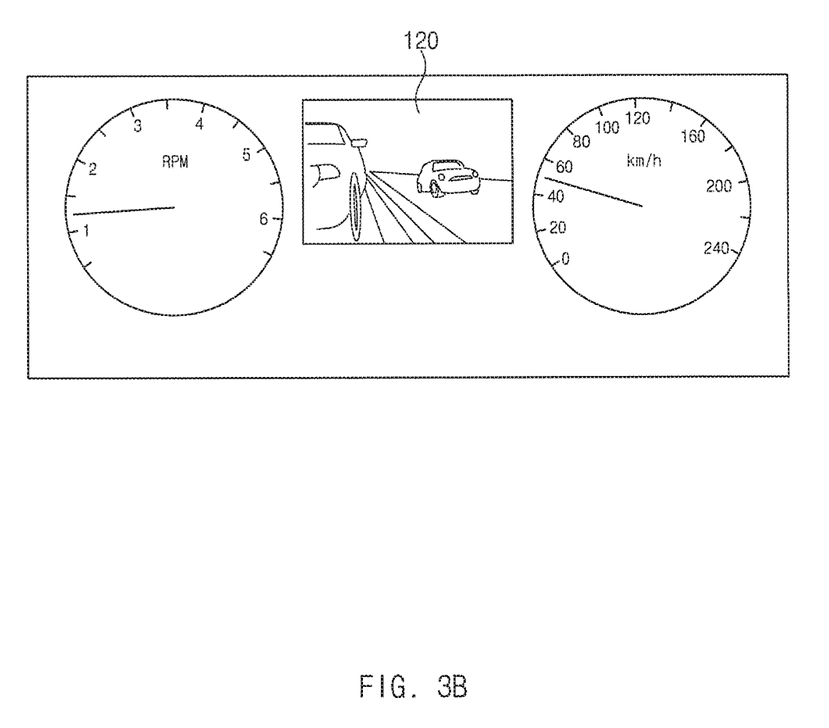
FIG. 3B illustrates a display unit that is positioned in a cluster of a vehicle and outputs a left-side rear-view image, according to an exemplary embodiment in the present disclosure.
Figure 3C:
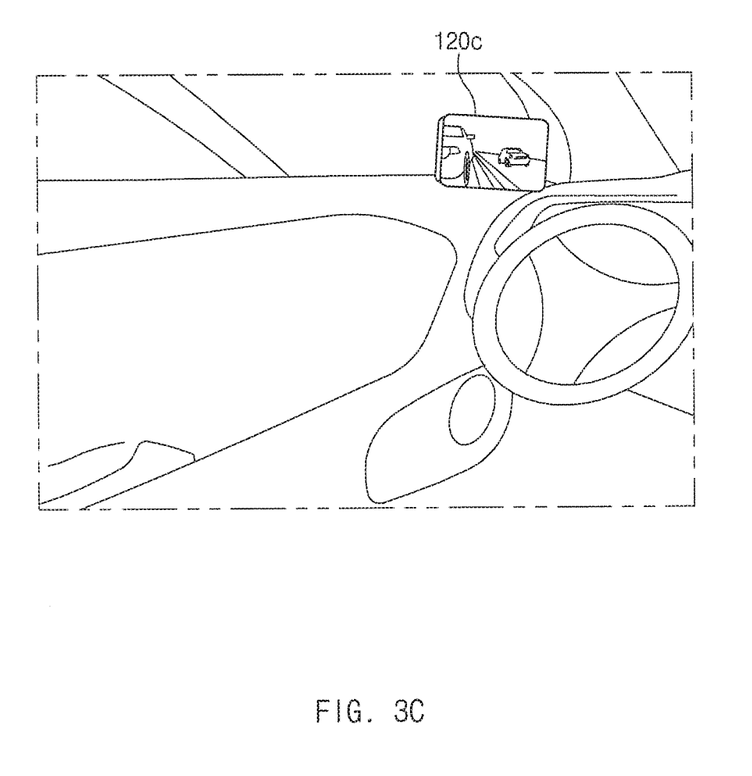
FIG. 3C illustrates a display unit that is positioned on the driver seat side of a vehicle and outputs a left-side rear-view image, according to an exemplary embodiment in the present disclosure.
Figure 3D:
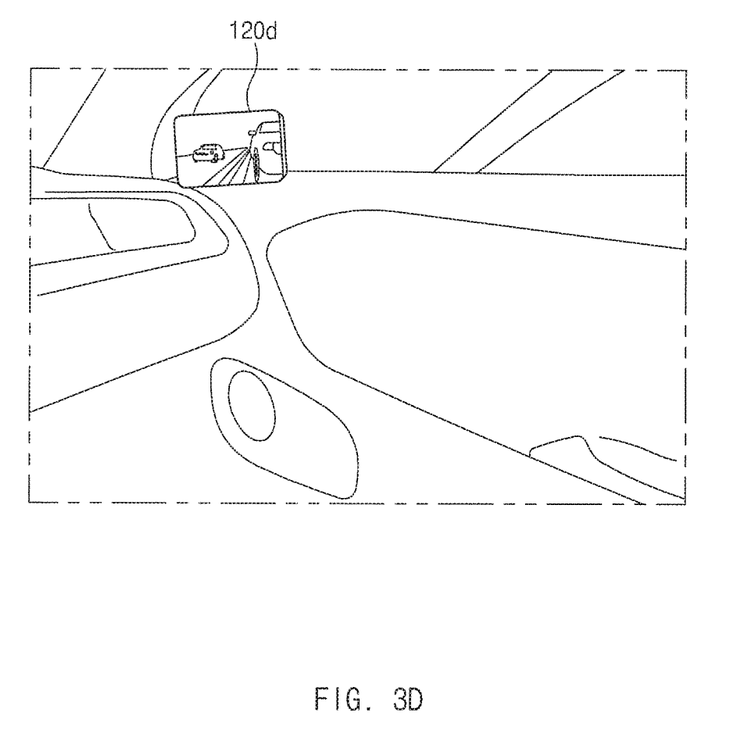
FIG. 3D illustrates a display unit that is positioned on the passenger seat side of a vehicle and outputs a right-side rear-view image, according to an exemplary embodiment in the present disclosure.

FIG. 1 illustrates a block diagram of a display system replacing a side mirror, according to an exemplary embodiment in the present disclosure. FIG. 2 illustrates a vehicle equipped with a camera, according to an exemplary embodiment in the present disclosure. FIG. 3A illustrates a display unit that is positioned in a center fascia of a vehicle and outputs a rear-view image, according to an exemplary embodiment in the present disclosure. FIG. 3B illustrates a display unit that is positioned in a cluster of a vehicle and outputs a left-side rear-view image, according to an exemplary embodiment in the present disclosure. FIG. 3C illustrates a display unit that is positioned on the driver seat side of a vehicle and outputs a left-side rear-view image, according to an exemplary embodiment in the present disclosure. FIG. 3D illustrates a display unit that is positioned on the passenger seat side of a vehicle and outputs a right-side rear-view image, according to an exemplary embodiment in the present disclosure.

Referring to FIG. 1, a display system replacing a side mirror includes a camera unit 110, a display unit 120, a control unit 130, and a driving condition detection unit 140.

However, the elements of the display system illustrated in FIG. 1 are not essential. The display system replacing a side mirror may have more elements or fewer elements.

The camera unit 110 may be equipped on both side surfaces of a subject vehicle to obtain a rear-view image. As illustrated in FIG. 2, the camera unit 110 may be mounted in a position where a side mirror of a general vehicle is equipped to obtain a rear-view image with respect to a field of view that the side mirror provides to a driver. Although not illustrated in FIG. 2, the camera unit 110 includes a plurality of cameras that may be mounted on a right side surface of the vehicle as well as a left side surface of the vehicle and may also be mounted on a rear surface of the vehicle.

The display unit 120 may output the rear-view image obtained by the camera unit 110. The display unit 120 may provide a field of view that is generally provided by the side mirror of the vehicle to the driver.

The display unit 120 may be disposed in various positions of the vehicle. Examples of the position of the display unit 120 will be described with reference to FIGS. 3A to 3D.

The display unit 120 may be positioned in a center fascia of the vehicle as illustrated in FIG. 3A. The display unit 120 may be divided into two display parts 120a and 120b to output images obtained by respective cameras of the camera unit 110 mounted on both side surfaces of the vehicle.

In addition, the display unit 120 may be positioned in a cluster of the vehicle as illustrated in FIG. 3B. When the display unit 120 is positioned in the cluster of the vehicle, the driver may recognize both rear sides of the vehicle, without turning the head, since the cluster is positioned in front of the driver. The display unit 120 in FIG. 3B outputs an image obtained by a left-side camera of the vehicle, but may output an image obtained by a right-side camera of the vehicle. In addition, the display unit 120 may output the image obtained by the left-side camera and the image obtained by the right-side camera simultaneously as illustrated in FIG. 3A.

In addition, the display unit 120 includes a plurality of display parts, each of which may be positioned in one side of the interior of the vehicle as illustrated in FIGS. 3C and 3D. FIGS. 3C and 3D illustrate display parts 120c and 120d disposed in positions corresponding to the field of view of the driver who sees traditional side mirrors. The display part 120c of FIG. 3C may output the image obtained by the left-side camera, and the display part 120d of FIG. 3D may output the image obtained by the right-side camera.

The display unit 120 may output the image obtained by the camera unit 110 disposed in a position corresponding to the position of the display unit 120. For example, when the display unit 120 outputs the images obtained by the left-side and right-side cameras of the camera unit 110 simultaneously as illustrated in FIG. 3A, the left-side display part 120a may output the image obtained by the left-side camera and the right-side display part 120b may output the image obtained by the right-side camera.

In addition, when the plurality of display parts 120c and 120d are positioned in the interior of the vehicle as illustrated in FIGS. 3C and 3D, the display part 120c positioned on the left side of a steering wheel of the subject vehicle may output the image obtained by the left-side camera, and the display part 120d positioned on the right side of the steering wheel of the subject vehicle may output the image obtained by the right-side camera.

However, the position and the image output method of the display unit 120 are not limited to the aforementioned examples illustrated in FIGS. 3A to 3D, and parts or the whole of the examples illustrated in FIGS. 3A to 3D may be employed.

The brightness of the rear-view image output by the display unit 120 may be controlled by the control unit 130, which will be detailed below.

The control unit 130 may control output brightness of the display unit 120 on the basis of driving conditions detected by the driving condition detection unit 140. The control unit 130 may control the output brightness of the display unit 120 to be brighter when a predetermined driving condition is detected than when the predetermined driving condition is not detected. A method of the control unit 130 for controlling the output brightness of the rear-view image will be detailed below.

The driving condition detection unit 140 may detect driving conditions of the subject vehicle, and includes a speed detector 141, a rear vehicle detector 142, a turn signal lamp operation detector 143, a lane departure detector 144, and an illumination detector 145.

The speed detector 141 may measure a speed of the subject vehicle. The speed detector 141 may measure the speed of the vehicle using the number of revolutions of wheels and the circumferences of the wheels, and may also measure the speed of the vehicle by calculating a moving distance using a global positioning system (GPS).

The rear vehicle detector 142 may detect a rear vehicle positioned behind the subject vehicle. The rear vehicle detector 142 may use a rear cross alert (RCA) or blind spot detection (BSD) sensor. The rear vehicle detector 142 may detect the rear vehicle to determine the speed and position of the rear vehicle.

The turn signal lamp operation detector 143 may detect the operation of a turn signal lamp of the subject vehicle. The turn signal lamp operation detector 143 may detect whether or not each of a left turn signal lamp and a right turn signal lamp is operated, and may also detect that both the left turn signal lamp and the right turn signal lamp are operated as emergency lights.

The lane departure detector 144 may detect the lane departure of the subject vehicle. The lane departure detector 144 may detect whether or not the subject vehicle moves out of its lane from an image obtained by the camera unit 110, a black box camera, or the like, provided in the subject vehicle.

The illumination detector 145 may measure the brightness (intensity) of light illuminating the subject vehicle. The illumination detector 145 may measure the brightness of light from the image obtained by the camera unit 110, and may measure the brightness of light as a separate sensor.

Hereinafter, a method for controlling the output brightness of the display unit 120 will be described.

The control unit 130 may control the output brightness of the display unit 120 to be brighter when a driving condition in which a speed or the subject vehicle is less than or equal to a predetermined speed is detected than when the speed of the subject vehicle exceeds the predetermined speed.

For example, when the vehicle is parked or passes through a narrow alley, it is highly necessary to monitor the surroundings of the vehicle, and thus, the control unit 130 may increase the output brightness of the display unit 120 when the speed of the vehicle is low. In addition, when the vehicle runs at high speed, the driver needs to see ahead, and in order to prevent the driver's eyes from focusing on the display unit 120, the control unit 130 may reduce the output brightness of the display unit 120 when the speed of the vehicle is high.

In addition, the control unit 130 may control the output brightness of the display unit 120 to be brighter when a driving condition in which a distance from the subject vehicle to a rear vehicle behind the subject vehicle, which is detected by the rear vehicle detector 142, is less than or equal to predetermined distance is detected than when the distance from the subject vehicle to the rear vehicle exceeds the predetermined distance.

For example, when the distance from the subject vehicle to the rear vehicle is within 50 m, a risk of collision may be increased, and thus, the control unit 130 may increase the output brightness of the display unit 120.

Here, the control unit 130 may control the output brightness of the rear-view image to be brighter as the distance from the subject vehicle to the rear vehicle is reduced.

In addition, the control unit 130 may determine the position of the rear vehicle in relation to the position of the subject vehicle, and may control the output brightness of the rear-view image obtained by the camera unit 110 positioned on the left side surface of the subject vehicle when the rear vehicle within the predetermined distance is positioned on the left side of the subject vehicle and control the output brightness of the rear-view image obtained by the camera unit 110 positioned on the right side surface of the subject vehicle when the rear vehicle within the predetermined distance is positioned on the right side of the subject vehicle.

In addition, the control unit 130 may calculate a relative speed of the rear vehicle with respect to the subject vehicle on the basis of the distance from the subject vehicle to the rear vehicle behind the subject vehicle, and may control the output brightness of the display unit 120 to be brighter W when a driving condition in which the relative speed exceeds 0 is detected than when the relative speed is less than or equal to 0.

For example, while the subject vehicle is running at 50 km/h and the rear vehicle is running at 70 km/h, the relative speed is 20 km/h, and thus, the output brightness of the display unit 120 may be controlled. Although the rear vehicle is far away from the subject vehicle, when the relative speed of the rear vehicle with respect to the subject vehicle exceeds 0, the distance between the rear vehicle and the subject vehicle is reduced, and thus, there may be a risk of collision.

Here, the control unit 130 may control the output brightness of the rear-view image on the basis of a level the relative speed. For example, as the level of the relative speed is increased, the output brightness of the display unit 120 may increase.

In addition, the control unit 130 may also control the output brightness of the display unit 120 to be brighter when a driving condition in which a relative acceleration as well as the relative speed exceeds 0 is detected than when the relative acceleration is less than or equal to 0, and may control the output brightness of the rear-view image on the basis of a level of the relative acceleration.

The control unit 130 may control the output brightness of the display unit 120 to be brighter when a driving condition in which a turn signal lamp is operated is detected than when the turn signal lamp is not operated.

For example, the driver may operate the right turn signal lamp before changing to a right lane. In this case, the turn signal lamp operation detector 143 may detect that the right turn signal lamp is operated, and the control unit 130 may increase the output brightness of the image in a direction in which the corresponding turn signal lamp is operated such that it may more clearly determine whether or not the rear vehicle is approaching the subject vehicle. In other words, when the right turn signal lamp is operated, the control unit 130 may control the output brightness of the rear-view image obtained by the camera of the camera unit 110 positioned on the right side surface of the subject vehicle, and when the left turn signal lamp is operated, the control unit 130 may control the output brightness of the rear-view image obtained by the camera of the camera 110 positioned on the left side surface of the subject vehicle.

In addition, the control unit 130 may control the output brightness of the display unit 120 to be brighter when a driving condition in which the subject vehicle moves out of the lane is detected than when the subject vehicle does not move out of the lane.

When the subject vehicle moves out of its lane while running straight, the control unit 130 may increase the output brightness of the image, thereby allowing the driver to recognize that the subject vehicle has moved out of the lane.

The control unit 130 may determine the position of a lane from which the subject vehicle has departed in relation to the subject vehicle, and may control the output brightness of the rear-view image obtained by the camera of the camera unit 110 positioned on the left side surface of the subject vehicle when the lane from which the subject vehicle has departed is positioned on the left side of the subject vehicle, and control the output brightness of the rear-view image obtained by the camera of the camera unit 110 positioned on the right side surface of the subject vehicle when the lane from which the subject vehicle has departed is positioned on the right side of the subject vehicle.

In addition, the control unit 130 may control the output brightness of the display unit 120 to be brighter when a driving condition in which a level of illumination, which is the brightness (intensity) of light illuminating the subject vehicle, is higher than or equal to a predetermined level of illumination is detected than when the level of illumination is lower than the predetermined level of illumination.

For example, when the subject vehicle exits a tunnel, the brightness of light illuminating the subject vehicle is increased, compared to when the subject vehicle is within the tunnel. When the brightness of light is increased, this constricts the pupils of the driver. In this case, if the brightness of the display unit 120 is low, it may be difficult for the driver to clearly recognize the output image.

On the contrary, the pupils of the driver are dilated in a place where the brightness of light is low. In this case, if the output brightness of the display unit 120 is high, the driver may feel dazzling. When the brightness of light illuminating the subject vehicle is high, the control unit 130 may increase the output brightness of the display unit 120, and when the brightness of light illuminating the subject vehicle is low, the control unit 130 may reduce the output brightness of the display unit 120.

When the control unit 130 controls the output brightness of the display unit 120 to be brighter whenever the aforementioned predetermined driving condition is detected, the brightness of the display unit 120 may be frequently changed in a case in which an instant event such as the operation of the turn signal lamp occurs. In this case, the changes in the brightness of the display unit 120 may interrupt the driver's driving. A method of the control unit 130 for controlling the display unit 120 in order to solve the aforementioned problem will be described with reference to FIGS. 4 and 5.

Figure 4:
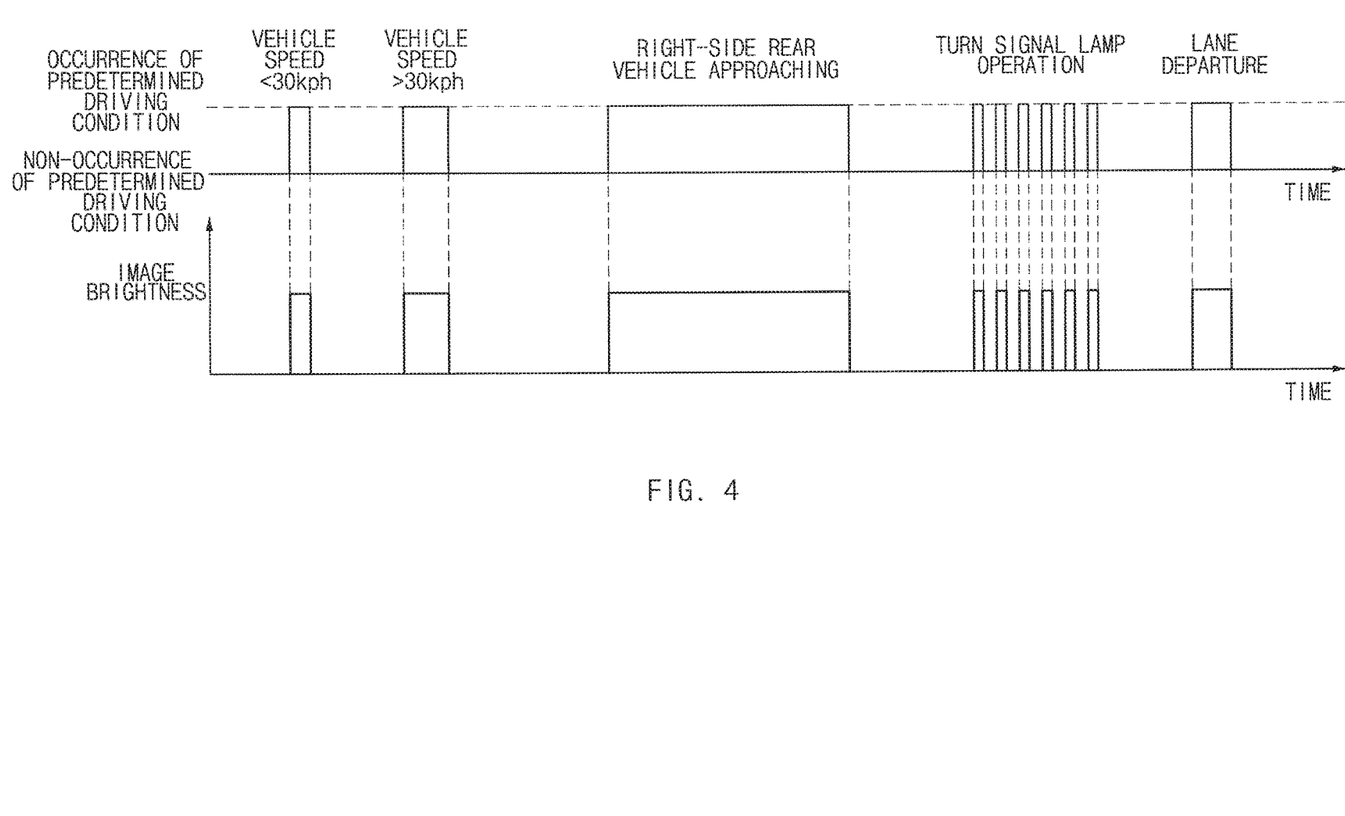
FIG. 4 illustrates a graph of image brightness that is output according to time and whether or not a reference driving condition is detected, according to an exemplary embodiment in the present disclosure.
Figure 5:
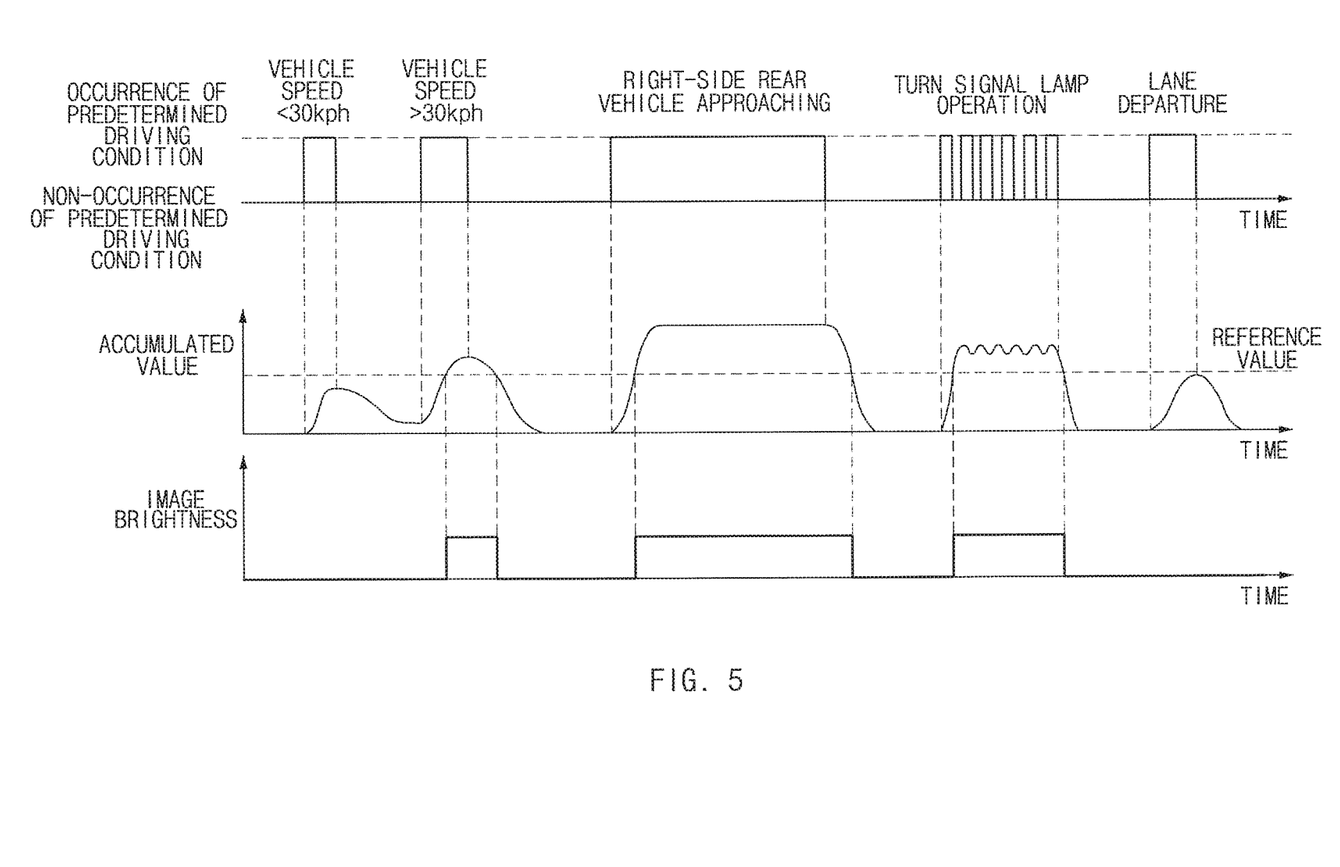
FIG. 5 illustrates a graph of image brightness that is output by varying an accumulated value according to time and whether or not a reference driving condition is detected, according to an exemplary embodiment in the present disclosure.

FIG. 4 illustrates a graph of image brightness that is output according to time and whether or not a predetermined driving condition is detected, according to an exemplary embodiment in the present disclosure. FIG. 5 illustrates a graph of image brightness that is output by varying an accumulated value according to time and whether or not a predetermined driving condition is detected, according to an exemplary embodiment in the present disclosure.

If the output brightness of the display unit 120 is controlled whenever a predetermined driving condition is detected, the brightness of the image may frequently be changed in a short period of time as illustrated in FIG. 4 when a turn signal lamp is operated.

The control unit 130 may not immediately control the output brightness of the display unit 120 when a predetermined driving condition is detected, but may increase an accumulated value over a period of time for which the predetermined driving condition is detected or may decrease the accumulated value over a period of time for which the predetermined driving condition is not detected. The control unit 130 may control the output brightness of the display unit 120 to be brighter when the accumulated value exceeds a reference value than when the accumulated value is less than or equal to the reference value.

FIG. 5 illustrates variations in accumulated value and image brightness according to time and whether or not a predetermined driving condition is detected.

The control unit 130 may increase an accumulated value over a period of time for which a driving condition in which the speed of the subject vehicle is lower than 30 km/s is detected. However, if the accumulated value does not exceed a reference value since the duration time for which the driving condition is detected is short, the control unit 130 may not control the brightness of the rear-view image on the display unit 120.

Thereafter, the control unit 130 may decrease the accumulated value over a period of time for which the predetermined driving condition is not detected. Then, the control unit 130 may increase the accumulated value again over a period of time for which the driving condition in which the speed of the subject vehicle is lower than 30 km/s is detected. The control unit 130 may control the brightness of the image to be brighter for a period of time for which the accumulated value exceeds the reference value.

Thereafter, when a driving condition in which a right-side rear vehicle is approaching is detected, the control unit 130 may increase the accumulated value, and thus, when the accumulated value exceeds the reference value, the control unit 130 may control the output brightness of the display unit 120.

Then, a driving condition in which a turn signal lamp is operated frequently occurs in a short period of time. Referring to FIG. 4, if variations in the accumulated value are not applied to the control operation of the control unit 130, the control unit 130 may control the brightness of the image on the display unit 120 whenever the turn signal lamp is operated.

However, if variations in the accumulated value are applied as illustrated in FIG. 5, the control unit 130 may increase the accumulated value when the turn signal lamp is operated and may decrease the accumulated value when the turn signal lamp is not operated. Although the turn signal lamp is not operated and the accumulated value is decreased, the accumulated value has already been increased, and thus, it can be seen that the accumulated value exceeds the reference value. Even if the turn signal lamp is not operated, the accumulated value exceeds the reference value since the time for which the turn signal lamp not operated is very short, and thus, the control unit 130 may control the brightness of the rear-view image on the display unit 120 to be maintained in a bright state.

Thereafter, when the subject vehicle moves out of its lane, the accumulated value may be increased. However, since the accumulated value does not exceed the reference value, the control unit 130 may control the brightness of the image to be maintained in a dark state.

Although not shown, when controlling the brightness of the image, the control unit 130 may control the output brightness of the display unit 120 by a fade-in and face-out method in which the brightness of the image is gradually increased or decreased.

As another method, when the detection of predetermined driving condition is maintained for a predetermined time or more, the control unit 130 may control the output brightness of the display unit 120. For example, when the detection of a driving condition in which the vehicle is running at a speed lower than or equal to 30 km/h is maintained for three or more seconds, the control unit 130 may control the output brightness of the display unit 120.

Hereinafter, a method for controlling output brightness of a display system replacing a side mirror will be detailed with reference to FIG. 6, on the basis of the aforementioned elements and features.

Figure 6:
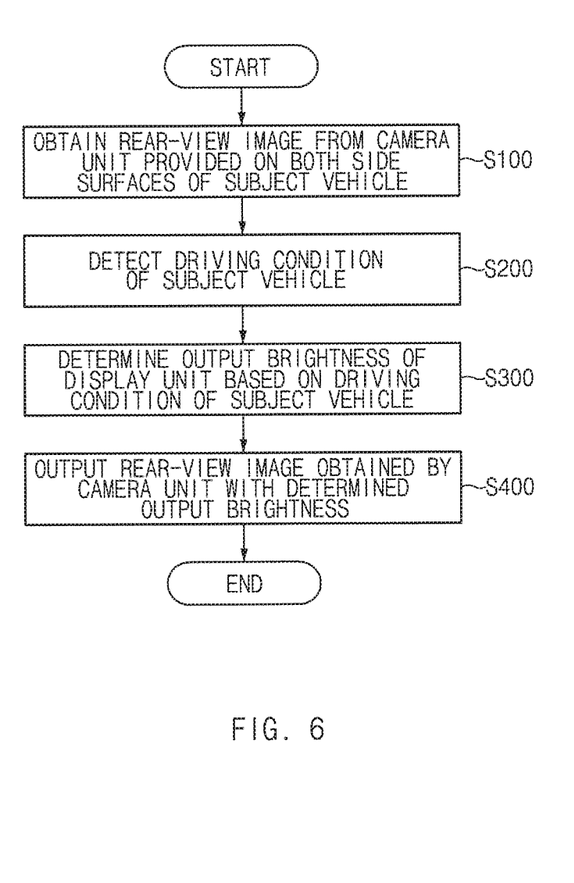
FIG. 6 illustrates a flowchart of a method for controlling output brightness of a display system replacing a side mirror, according to an exemplary embodiment in the present disclosure.

FIG. 6 illustrates a flowchart of a method for controlling output brightness of a display system replacing a side mirror, according to an exemplary embodiment in the present disclosure.

Referring to FIG. 6, the method for controlling output brightness of a display system replacing a side mirror includes: obtaining a rear-view image from a camera unit provided on both side surfaces of a subject vehicle in operation S100; detecting a driving condition of the subject vehicle in operation S200; determining output brightness of a display unit on the basis of the driving condition of the subject vehicle in operation S300; and outputting the rear-view image obtained by the camera unit with the determined output brightness in operation S400.

Hereinafter, operations S100 to S400 will be detailed.

In operation S100, the camera unit 110 may be provided on both side surfaces of the subject vehicle and obtain the rear-view image. The camera unit 110 includes a plurality of cameras that may obtain both side rear-view images of the subject vehicle.

In operation S200, the driving condition detection unit 140 may detect the driving condition of the subject vehicle. As described above, the driving condition detection unit 140 includes the speed detector 141, the rear vehicle detector 142, the turn signal lamp operation detector 143, the lane departure detector 144, and the illumination detector 145, and may be able to measure a speed of the subject vehicle, detect a rear vehicle, detect whether or not a turn signal lamp is operated, detect whether or not the subject vehicle moves out of its lane, and detect the brightness of light illuminating the subject vehicle.

In operation S300, the control unit 130 may determine the output brightness of the display unit 120 on the basis of the driving condition of the subject vehicle. The control unit 130 may control the output brightness of the display unit 120 to be brighter when a predetermined driving condition is detected than when the predetermined driving condition is not detected.

In addition, when the detection of the predetermined driving condition is maintained for a predetermined time or more, the control unit 130 may determine the output brightness of the display unit 120 to be changed, and may also determine the output brightness of the display unit 120 by applying the aforementioned variations in the accumulated value to the detection of the predetermined driving condition.

In operation S400, the display 120 may output the rear-view image obtained by the camera unit 110 with the output brightness determined by the control unit 130.

The display system replacing a side mirror is not limited by the aforementioned features and control methods in the above-described exemplary embodiments. In order to make modifications and variations to the exemplary embodiments, parts or the whole of the exemplary embodiments may be selectively combined.

As set forth above, the display system according to the exemplary embodiments provides a driver with a side camera image with an appropriate brightness level adequate for driving conditions to improve driving convenience.

The effects of the present inventive concept are not limited to the aforementioned effects, and any other effects not mentioned herein will be clearly understood from the detailed description of the embodiments by those skilled in the art to which the present disclosure pertains.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A display system replacing a side mirror, the display system comprising:
    a plurality of cameras provided on both side surfaces of a vehicle and obtaining a rear-view image;
    a display displaying the rear-view image obtained by the cameras;
    a driving condition detector detecting a driving condition of the vehicle, the driving condition detector including a lane departure sensor detecting whether or not the vehicle moves out of its lane; and
    a controller controlling output brightness of the display based on the driving condition of the vehicle, the controller increasing the output brightness of an entire screen of the display when the vehicle is out of the lane,
    wherein the controller increases an accumulated value when a reference driving condition is detected, and decreases the accumulated value when the reference driving condition is not detected, and
    the controller increases the output brightness of the display when the accumulated value exceeds a reference value.

2. The display system according to claim 1, wherein the controller increases the output brightness of the display when the driving condition satisfies a reference driving condition.

3. The display system according to claim 1, wherein the controller maintains the output brightness of the display when a reference driving condition is maintained for a reference time or more.

4. The display system according to claim 1, wherein the driving condition detector includes a speed sensor measuring a speed of the vehicle, and
    the controller increases the output brightness of the display when the speed of the vehicle is lower than or equal to a reference speed.

5. The display system according to claim 1, wherein the controller determines a position of the rear vehicle in relation to the vehicle,
    the controller controls output brightness of a rear-view image, which is obtained by a camera positioned on a left side surface of the vehicle, when the rear vehicle is positioned on a left side of the vehicle, and
    the controller controls output brightness of a rear-view image, which is obtained by a camera positioned on a right side surface of the vehicle, when the rear vehicle is positioned on a right side of the vehicle.

6. The display system according to claim 1, wherein the controller calculates a relative speed of the rear vehicle with respect to the vehicle based on the distance from the vehicle to the rear vehicle, and
    the controller increases the output brightness of the display when the relative speed exceeds 0.

7. The display system according to claim 6, wherein the controller controls output brightness of the rear-view image based on a level of the relative speed.

8. The display system according to claim 6, wherein the controller calculates a relative acceleration of the rear vehicle with respect to the vehicle based on the relative speed, and
    the controller increases the output brightness of the display when the relative acceleration exceeds 0.

9. The display system according to claim 8, wherein the controller controls output brightness of the rear-view image based on a level of the relative acceleration.

10. The display system according to claim 1, wherein the driving condition detector includes a turn signal lamp sensor detecting whether or not a turn signal lamp of the vehicle operates, and
    the controller increases the output brightness of the display when the turn signal lamp operates.

11. The display system according to claim 10, wherein the controller controls output brightness of a rear-view image obtained by a camera, which is positioned on a left side surface of the vehicle when a left turn signal lamp operates, and
    the controller controls output brightness of a rear-view image obtained by a camera, which is positioned on a right side surface of the vehicle, when a right turn signal lamp operates.

12. The display system according to claim 1, wherein the controller determines a position of the lane from which the vehicle departs
    the controller controls output brightness of a rear-view image obtained by a camera, which is positioned on a left side surface of the vehicle, when the lane is positioned on a left side of the vehicle, and
    the controller controls output brightness of a rear-view image obtained by a camera, which is positioned on a right side surface of the vehicle, when the lane is positioned on a right side of the vehicle.

13. The display system according to claim 1, wherein the driving condition detector includes an illumination sensor measuring a level of illumination which is brightness of light illuminating the vehicle, and
    the controller increases the output brightness of the display when the level of illumination is higher than or equal to a reference level of illumination.

14. The display system according to claim 1, wherein the display is installed at a cluster of the vehicle.

15. The display system according to claim 1, wherein the display comprises a plurality of display parts including:

a left display part positioned on a left side of a steering wheel of the vehicle among the plurality of display parts, the left display part outputting a rear-view image obtained by a camera, which is positioned on a left side surface of the vehicle, and a right display part positioned on a right side of the steering wheel of the vehicle among the plurality of display parts, the right display part outputting a rear-view image obtained by a camera, which is positioned on a right side surface of the vehicle.

16. The display system according to claim 1, wherein the driving condition detector includes a rear vehicle position sensor measuring a distance from the vehicle to a rear vehicle located behind the vehicle, and the controller increases the output brightness of the display when the distance from the vehicle to the rear vehicle is less than or equal to a reference distance.

17. A method for controlling output brightness of a display system replacing a side mirror, the method comprising:

obtaining a rear-view image from a camera provided on both side surfaces of a vehicle;

detecting, by a driving condition detector, a driving condition of the vehicle;

detecting, by the driving condition detector, whether or not the vehicle moves out of its lane;

determining, by a controller, output brightness of a display on the basis of the driving condition of the vehicle, and increasing the output brightness of an entire screen of the display when the vehicle is out of the lane; and displaying, by the display, the rear-view image with the determined output brightness, wherein the controller increases an accumulated value when a reference driving condition is detected, and decreases the accumulated value when the reference driving condition is not detected, and the controller increases the output brightness of the display when the accumulated value exceeds a reference value.

* * * * *